(12) United States Patent
Guionneau et al.

(10) Patent No.: US 11,468,157 B2
(45) Date of Patent: Oct. 11, 2022

(54) METHOD FOR AUTHENTICATING A USER BY USER IDENTIFIER AND ASSOCIATED GRAPHICAL PASSWORD

(71) Applicant: EVIDIAN, Les Clayes-sous-Bois (FR)

(72) Inventors: Christophe Guionneau, Grenoble (FR); Valérie Clement, Meylan (FR)

(73) Assignee: EVIDIAN, Les Clayes-sous-Bois (FR)

( * ) Notice: Subject to any disclaimer, the term of this patent is extended or adjusted under 35 U.S.C. 154(b) by 314 days.

(21) Appl. No.: 16/590,498

(22) Filed: Oct. 2, 2019

(65) Prior Publication Data
US 2020/0104475 A1    Apr. 2, 2020

(30) Foreign Application Priority Data
Oct. 2, 2018    (FR) ...................... 18 59146

(51) Int. Cl.
*G06F 21/36*    (2013.01)
*G06F 21/46*    (2013.01)
(Continued)

(52) U.S. Cl.
CPC .............. *G06F 21/36* (2013.01); *G06F 21/46* (2013.01); *G06F 21/602* (2013.01); *H04L 9/0643* (2013.01); *G06F 2221/2103* (2013.01)

(58) Field of Classification Search
CPC ........ G06F 21/36; G06F 21/46; G06F 21/602; G06F 2221/2103; H04L 9/0643
See application file for complete search history.

(56) References Cited

U.S. PATENT DOCUMENTS 8,813,183 B2 *  8/2014  Thibadeau .............. G06F 21/36
                                                     713/168
8,881,251 B1 * 11/2014  Hilger .................. H04L 63/083
                                                     726/19
(Continued)

FOREIGN PATENT DOCUMENTS

WO    2012/146587 A1    11/2012

OTHER PUBLICATIONS

Malih, R.A., 2015. User Authentication System Using Emoji pictures passwords (Doctoral dissertation, Middle East University). (Year: 2015).*

(Continued)

*Primary Examiner* — James R Turchen
(74) *Attorney, Agent, or Firm* — Meagher Emanuel Laks Goldberg & Liao, LLP

(57) ABSTRACT

Disclosed is a method for authenticating a user by user identifier and associated graphical password. The graphical password includes a sequence of several images belonging to a group of images. The user provides a user identifier to an application, and graphically selects a sequence of several images in this group of images, the image order being randomly displayed by the application with each authentication of the user. The application identifies the position of each selected image in the sequence, establishes the correspondence between the sequence of the positions and the sequence of the identifiers of the selected images, compares the sequence of the selected images identifiers with the registered sequence, the application being the only entity able to establish this correspondence and/or the application being the only entity able to make this comparison, and authenticates the user if the comparison is positive but refuses authentication for negative comparison.

13 Claims, 3 Drawing Sheets

(51) Int. Cl.
G06F 21/60 (2013.01)
H04L 9/06 (2006.01)

(56) References Cited

U.S. PATENT DOCUMENTS

| | | | | |
|---|---|---|---|---|
| 9,053,294 | B2* | 6/2015 | Burkill | G06F 21/46 |
| 10,120,989 | B2* | 11/2018 | Anson | G06F 21/31 |
| 10,169,566 | B1* | 1/2019 | Mossoba | G06F 40/12 |
| 10,182,047 | B1* | 1/2019 | Buehl | G06F 3/04886 |
| 10,754,814 | B1* | 8/2020 | Li | G06F 21/36 |
| 10,848,482 | B1* | 11/2020 | Eisen | H04L 63/0853 |
| 11,250,075 | B1* | 2/2022 | Al Majid | G06F 16/9536 |
| 2004/0030934 | A1* | 2/2004 | Mizoguchi | G06F 21/36 |
| | | | | 726/18 |
| 2004/0230843 | A1* | 11/2004 | Jansen | G06F 21/36 |
| | | | | 713/184 |
| 2009/0077653 | A1* | 3/2009 | Osborn | G06F 21/36 |
| | | | | 715/764 |
| 2010/0043062 | A1* | 2/2010 | Alexander | H04L 9/3226 |
| | | | | 726/6 |
| 2010/0169958 | A1* | 7/2010 | Werner | G06F 21/36 |
| | | | | 726/19 |
| 2013/0167225 | A1* | 6/2013 | Sanft | G06F 3/04842 |
| | | | | 726/19 |
| 2013/0340057 | A1* | 12/2013 | Kitlyar | G06F 21/36 |
| | | | | 726/6 |
| 2013/0347087 | A1* | 12/2013 | Smith | G06F 21/36 |
| | | | | 726/19 |
| 2014/0053254 | A1* | 2/2014 | Sun | G06F 21/36 |
| | | | | 726/7 |
| 2015/0178490 | A1* | 6/2015 | Tamboly | G06F 21/46 |
| | | | | 726/4 |
| 2016/0306994 | A1* | 10/2016 | Olsen-Kreusch | H04L 9/3234 |
| 2017/0032113 | A1* | 2/2017 | Tunnell | H04L 9/3231 |
| 2017/0228745 | A1* | 8/2017 | Garcia | G06Q 30/0203 |
| 2019/0377861 | A1* | 12/2019 | Whitney | G06F 21/45 |
| 2020/0026843 | A1* | 1/2020 | Anwar | G06F 3/0446 |

OTHER PUBLICATIONS

Rauhut, M. and Kjellevand, M., 2018. Evaluating the Security and Usability of Emoji-Based Authentication (Master's thesis, NTNU). (Year: 2018).*

Seitz, T., Mathis, F. and Hussmann, H., Nov. 2017. The bird is the word: a usability evaluation of emojis inside text passwords. In Proceedings of the 29th Australian Conference on Computer-Human Interaction (pp. 10-20). (Year: 2017).*

Kraus, L., Schmidt, R., Walch, M., Schaub, F. and Moller, S., May 2017. On the use of emojis in mobile authentication. In IFIP International Conference on ICT Systems Security and Privacy Protection (pp. 265-280). Springer, Cham. (Year: 2017).*

Vinothini, T., Rajesh, I. and Kirupa Rani, D., 2014. Multiple grid based graphical text password authentication. International Journal of Research in Engineering and Technology, 3, pp. 502-507. (Year: 2014).*

FR Search Report, dated Mar. 19, 2019, from corresponding FR application No. 1859146.

* cited by examiner

METHOD FOR AUTHENTICATING A USER BY USER IDENTIFIER AND ASSOCIATED GRAPHICAL PASSWORD

FIELD OF THE INVENTION

The invention relates to the field of methods for authenticating a user by user identifier and associated graphical password, as well as the field of methods for creating a graphical password associated with a user identifier.

BACKGROUND OF THE INVENTION

Applications or web application portals require authentication mechanisms that are robust yet simple to use, in other words ergonomic, for the different user populations, whether these are enterprise employees or clients. The authentication mechanisms chosen will be sufficiently robust to certify that the authenticated user is not a stolen identity. The main authentication method is password authentication, this method being simple to implement but unfortunately not very robust.

According to a first prior art, a method is known for authenticating a user to an application by using an alphanumeric password associated with a user identifier. This first type of password has three security disadvantages. A first disadvantage is that this first type of alphanumeric password is easily cracked by a dictionary attack (using a password dictionary) and/or a brute force attack (applying all possible or plausible combinations). A second disadvantage is that this first type of alphanumeric password is easy to hack via an intrusion type of attack between the user and the application in order to monitor their exchanges and extract the password.

According to a second prior art, a method is known for authenticating a user to an application by using a PIN code type of password (PIN for "Personal Identification Number") associated with a user identifier. This second type of password is slightly more robust than the first but has two security disadvantages. A first disadvantage is that this PIN code second type of password can be hacked by a malicious application detecting the eye movement of the user when he or she is entering the PIN code, the number of remaining probable combinations then being very small and can then easily all be attempted. A second disadvantage is that this PIN code second type of password is easily hacked by an intrusion type of attack between the user and the application in order to monitor their exchanges and extract the password.

One could also consider a method for authenticating a user to an application by using a graphical password associated with a user identifier. This third type of graphical password is then composed of a sequence of images and is slightly more robust than the first type but would still have two security disadvantages. A first disadvantage is that this third type of graphical password could be hacked by a malicious application detecting the user's eye movements when the user is entering his or her graphical password, the number of remaining probable combinations then being very small and could then all easily be attempted. A second disadvantage is that this third type of graphical password could easily be hacked by an intrusion type of attack between the user and the application in order to monitor their exchanges and extract the password.

All of the techniques for authenticating a user to an application by using a password associated with a user identifier, existing or conceivable from existing techniques, have at least two security disadvantages which are:
a first disadvantage of being relatively easily hacked by a malicious application type of attack detecting the user's eye movements when entering his or her graphical password,
a second disadvantage of being relatively easily hacked by an intrusion type of attack between the user and the application in order to monitor their exchanges and extract the password.

According to a fourth prior art, which is mentioned here only for informational purposes, multifactor authentication mechanisms are used. These mechanisms are based on the possession of an object, such as a USB key containing a secret or a particular encryption mechanism, or such as a mobile phone to which a notification is sent containing an additional secret element such as an additional secret code, or such as the use of messaging to send e-mails from a computer.

This fourth prior art is more complex, less practical, and not always more secure than the other three prior arts or extensions of the prior art. They require an additional object and/or additional step and/or additional secret code and/or depend on third parties not controlled by the applications such as telecommunication infrastructures for example.

This fourth prior art may be used in addition to the invention, but not in the place of the invention, as said invention will focus on providing an authentication method of a simplicity similar or comparable to methods which boil down to the simple use of a password, but with much higher security.

SUMMARY OF THE INVENTION

The object of the present invention is to provide a method for authenticating a user by user identifier and associated graphical password, which at least partially overcomes the above disadvantages.

More particularly, according to the invention, these security weaknesses arise from the fact that, regardless of the type of attack involved (visual detection or tactile detection), it is possible for a malicious application to detect where a user is entering the password and thus to retrieve the entered character or image, since the location of the character or the image on the virtual keyboard is always the same.

More particularly, according to the invention, the act of randomly changing the location of the characters or images on the virtual keyboard, frequently or even all the time, has the advantage of keeping the number of possible combinations very high, even if the malicious application is capable of detecting visually or tactilely where the user is entering the password when the user is doing so on the virtual keyboard at each authentication. However, if the position of the character or the image changes randomly each time, the detection of this position will become insufficient for the malicious application to significantly reduce the number of possible characters or images in order to discover the password. Conversely, of course, it is much more difficult, if not currently impossible, for a malicious application to visually detect not the movements of the user but the graphical representation on the virtual keyboard of the characters or images to be entered. Hence the very significant increase in the level of security by using a random change of characters or images to be selected to form the password.

In addition, to ensure an even higher level of security, in addition to the changing position of the characters or images to be selected to form the password, it is particularly attractive to have a large number of these characters or images to select from to form the password. Here, the invention highlights a new problem: ergonomics, the ease of use for the user. Indeed, if, in order to have a large number of characters to choose from to form the password, it is necessary to make use of uncommon characters (Greek alphabet for example) or combinations of characters (pair of letters, triplet of letters), the ergonomics will fall apart and the increasing difficulty of use will cause, in addition to user fatigue as the user will be reluctant to use such a password and system inefficiency because of numerous errors and memory lapses, a decrease in security as the users then tend to use the simplest passwords (for example the same character five times). This is why the invention recommends the use of images which are easily recognizable and memorable by the user even in large numbers and even in a sequence. The images need only be sufficiently distinct from one another and sufficiently "eloquent" on their own, in other words they bring to mind things that are distinct from one another and that the user is likely to remember more easily.

Ultimately, the invention proposes a better compromise between the security of the application used and the ergonomics or ease of use for the user, it being understood that too much difficulty of use often leads users to workarounds that result in creating new security vulnerabilities.

The invention proposes improving this compromise between security and ergonomics, as security also depends partly and indirectly on ergonomics, by the use of images that are easier to memorize in large numbers, while preserving a large number of possible combinations of images for reconstructing the password, by continuously and randomly changing the position of the images displayed, for example in a virtual keyboard on the viewing interface of a portable electronic device such as a mobile phone, even when a malicious application can detect (visually or tactilely) the position of the selections made by the user, for example on this virtual keyboard.

To this end, the invention proposes a method for authenticating a user by user identifier and associated graphical password, characterized in that: the graphical password comprises a sequence of several images belonging to a group of images; the user gives his or her user identifier to an application, and graphically selects a sequence of several images in this group of images, the order of the images in this group of images being randomly displayed by the application with each new authentication of said user; the application identifies the position of each selected image in said sequence, establishes the correspondence between the sequence of said positions and the sequence of the identifiers of the selected images, compares the sequence of the identifiers of the selected images with the sequence of the identifiers of the images of the password registered for said user identifier, the application being the only entity able to establish this correspondence and/or the application being the only entity able to make this comparison, and authenticates said user if said comparison is positive but refuses to authenticate said user if said comparison is negative.

To this end, the invention also proposes a method for authenticating a user by user identifier and associated graphical password, characterized in that: the graphical password comprises two parts, a first part obtained by a first selection of a group of images among several groups of images and a second part obtained by a second selection of a sequence of several images in the selected group of images; the user gives his or her user identifier to an application, and graphically performs a first selection of a group of images in a set of several groups of images, the order of the groups of images in this set of groups of images being randomly displayed by the application with each new authentication of said user, and a second selection of a sequence of several images in this group of images, the order of the images in this group of images being randomly displayed by the application with each new authentication of said user; the application identifies the position of the selected group of images in said set of groups of images and identifies the position of each selected image in said sequence, establishes the correspondence between the position of the selected group of images and the identifier of the selected group of images and between the sequence of the positions of the selected images and the sequence of the identifiers of the selected images, compares the identifier of the group of selected images with the identifier of the group of images of the password registered for said user identifier and compares the sequence of the identifiers of the selected images with the sequence of the identifiers of the images of the password registered for said user identifier, the application being the only entity able to establish this correspondence and/or the application being the only entity able to make this comparison, and authenticates said user if said comparison is positive but refuses to authenticate said user if said comparison is negative.

Dividing the graphical password into two parts provides several additional benefits:
  first at the security level, by increasing the number of possible image combinations for reconstructing the password, even when a malicious application can detect the position of the selections made by the user, for example on this virtual keyboard,
  then at the ergonomics level, and indirectly again at the security level as well, by making the two-part password more easily remembered by the user (memorizing and locating images is easier in a group organized into several small subgroups than in a large group with everything combined), without sacrificing the high number of possible combinations for reconstructing the password.

To this end, the invention also proposes a method for creating a graphical password associated with a user identifier, characterized in that: the graphical password comprises a part obtained by the selection, by the user, of a sequence of several images in the selected group of images, the order of the images in this group of images being intended to be displayed randomly by the application with each new authentication of said user.

To this end, the invention lastly proposes a method for creating a graphical password associated with a user identifier, characterized in that: the graphical password comprises two parts, a first part obtained by a first selection, by the user, of a group of images among several groups of images, the order of the groups of images in this set of groups of images being intended to be displayed randomly by the application with each new authentication of said user, and a second part obtained by a second selection, by the user, of a sequence of several images in the selected group of images, the order of the images in this group of images being intended to be displayed randomly by the application with each new authentication of said user.

According to preferred embodiments of the invention, the technical issues of the above methods are related to the difficulty of constructing an authentication principle, independent of any infrastructure, that is simple to use and to implement and without cost to the users.

According to preferred embodiments of the invention, this involves:

- proposing a method that is stronger than the method of authentication by simple password, for example alphanumeric,
- this method not requiring additional technical means such as a telephone or hardware tokens, or a complex server infrastructure, which can be arduous or cumbersome for the user,
- this method being usable for conventional applications, such as web applications or mobile applications or even as a means of unlocking a telephone or workstation,
- this method being simple for users to use, almost as simple as passwords without having the weaknesses.

According to preferred embodiments of the invention, some or all of the following advantages can be obtained:

- users have a stronger means of authentication than traditional passwords,
- users have a password-type authentication method that requires less complexity (length, special characters, alternating alphabets, etc.) than a password conventionally considered as robust, which makes it easier for the user to remember,
- users cannot use the same password in different systems or applications implementing the same principle, because the grids are generated randomly from large image collections,
- the authentication phase cannot be recorded by hacking applications (such as keyloggers) or by viruses logging the user's activity,
- the authentication phase cannot be recorded and replayed using a recording of exchanges between the graphical interface and the application by a hacking application ("man in the middle"), since the data exchanged are always random and temporary,
- the new methods for discovering PIN codes or unlocking schemes by recording the user's eye movements do not work for the random grids of randomly distributed images as proposed,
- the authentication method does not require an external infrastructure, so there is no cost involved for each authentication,
- the authentication method does not require a hardware token, certificate, or high-end mobile phone, or any type of equipment, possibly expensive, that a user would otherwise have to obtain,
- the method uses simple principles of backups, databases, and directories, and can work with ordinary hash algorithms, without requiring the use of resource-intensive cryptographic means with saved keys, to obtain a high level of security,
- the method does not require saving confidential user information, for example such as telephone number, fingerprints, etc.
- the method applies to resource-intensive, web, mobile applications, or even to the locking of mobile phones.

According to preferred embodiments, the invention comprises one or more of the following features which can be used separately or in any combination with one another and with any of the aforementioned objects of the invention.

Preferably, said order of the images in this group of images is randomly displayed by the application with each new authentication of said user, in the form of a grid of images distributed into rows and columns.

The two-dimensional distribution thus provides improved ergonomics with easier memorization and reconstruction by the user for a given number of images, than with a single image.

Preferably, said order of the groups of images in this set of groups of images is randomly displayed by the application with each new authentication of said user, in the form of a carousel of grids of images, and/or said order of the images in this group of images is randomly displayed by the application with each new authentication of said user, in the form of a grid of images distributed into rows and columns.

Thus, on the one hand the dynamic scrolling of the number of grids, the number of grids being lower and at least two or more times lower than the number of images in a grid, allows a quick and reasonable selection by the user, the grids grouping images by theme to facilitate the selection of a grid and its memorization by the user, and on the other hand the two-dimensional (and regular) distribution provides improved ergonomics with easier memorization and reconstruction by the user for a given number of images than with a one-dimensional display.

Preferably, the number of groups of images in the set of groups of images is at least two or even at least five times smaller than the number of images in a group of images, regardless of whether all the groups have the same number of images.

The ergonomics are thus improved, because on the one hand it is easier for the user to simultaneously view a relatively large number of images in a group of images, rather than to successively view a relatively large number of groups of images in a set of groups of images, and on the other hand, as a group of images contains much more visual information than one image, the image is clearly easier for the user to recognize quickly than a group of images is.

Preferably, the images are divided into the groups of images by theme.

The ergonomics for the user are thus further improved, because this allows the user to visually discriminate more quickly between groups of images.

Preferably, the user makes these two selections graphically: in a graphical interface that sends the number of the selected group and/or the coordinates of each selected image in said sequence, to an authentication function which establishes the correspondence between said number and the identifier of the selected group and/or between the sequence of said coordinates and the sequence of the identifiers of the selected images, the authentication function being the only entity able to establish this correspondence, in a database which compares the identifier of the selected group and the sequence of the identifiers of the selected images respectively with the identifier of the group of the password registered for said user identifier and with the sequence of the identifiers of the images of the password registered for said user identifier, the database being the only entity able to make this comparison, and which authenticates said user if said comparison is positive but refuses to authenticate said user if said comparison is negative.

Separating the information needed to reconstruct the password across several modules in the application makes it more difficult to steal the entire password; therefore it improves security but does not make it less ergonomic for the user because this separation is completely transparent to the user.

Preferably, said graphical interface, said authentication function, and said database are under the control of at least two independent actors, advantageously are respectively under the control of three independent actors; preferably, when said application runs in client-server mode, said graphical interface is located on the client while said authentication function and said database are located on the server.

Separating the application across several independent elements, each of them only possessing part of the information necessary to reconstruct the password, improves security but does not make it less ergonomic for the user because this separation is completely transparent to the user.

Preferably, said set of groups of images comprises a number of groups of images which is comprised between 3 and 10, and/or said groups of images each comprise a number of images which is comprised between 10 and 50.

These ranges of values, both for the number of groups of images and for the number of images per group of images, represent an optimization of the compromise between a high level of security and quality ergonomics for the user.

Preferably, several separate applications use the same images but with a different distribution between groups of images from one application to another.

This further increases the level of security, because the unwanted hacking of a password for one of the applications will not crack the other passwords for the other applications, as the user has been gently forced to choose very different passwords between applications, without noticeably decreasing the ergonomics for the user.

Preferably, the graphical password is stored by the application in a non-reversible form, preferably in a hashed form, this hashed form advantageously not having any collisions, this hashed form advantageously using a salting function introducing information relating to the user.

Thus, even if the database of the application is attacked and this attack succeeds, the information obtained, in this case a non-reversible form of the graphical password of the user, will not itself be sufficient for hacking the user's account. The absence of collisions prevents two graphical passwords belonging to two distinct users from giving the same hashed form, or at least this type of collision so rarely occurs it has no effect in actual practice. The salting function introducing information relating to the user increases the complexity of the hashed form of the user's graphical password, making a brute-force attack harder, even for a hacker who has accessed the application database where the user's graphical passwords are stored (therefore in a non-reversible form).

Preferably, either no image is common to two groups of images that are distinct from each other, or, if one or more images are common to at least two groups of images that are distinct from each other, then for at least half of the groups of images, any two groups of images in this half of the groups of images always have less than half of their images in common.

Thus, the absence of images in common between the different groups of images or at least the low proportion of images in common between the different groups of images, makes the division of the user's graphical password into two parts even more efficient, and the cracking of such a graphical password even more difficult.

Preferably, said order of the images in this group of images is displayed, by the application, in the form of a grid of images distributed into rows and columns.

Preferably, said order of the groups of images in this set of groups of images is displayed, by the application, in the form of a carousel of grids of images, and/or said order of the images in this group of images is displayed, by the application, in the form of a grid of images distributed into rows and columns.

The images are pictures and not simple alphanumeric characters; the images, being in particular figurative pictures representing an object or an action having meaning for the user, will therefore be easier for the user to remember than characters of an exotic alphabet or pairs of characters for example. Moreover, the number of such images that can be collected into an "image alphabet" is far greater than the number of alphanumeric characters easily recognizable by the majority of users.

Other features and advantages of the invention will be apparent from reading the following description of a preferred embodiment of the invention, given as an example and with reference to the accompanying drawings.

DETAILED DESCRIPTION OF THE INVENTION

Figure 1:
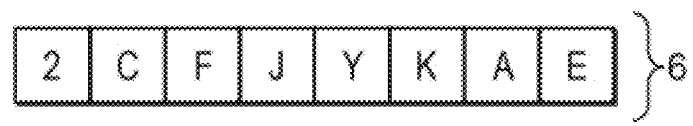
FIG. 1 schematically represents an example of a graphical password used in an authentication method according to one embodiment of the invention.

For all of FIGS. 1 to 4, the numbers 1 to 5 respectively represent groups of images, for example grids of images, while the letters A to Y represent images, for example emoticons. Although only 25 images (A to Y) are represented in the embodiment described, these 25 images, corresponding to grid 2, are part of a much larger image database of at least 100 images, even 1000 images or more. Similarly, only five grids 1 to 5 are considered because only five grids are proposed for each user to choose from, but these five grids are part of a larger database of at least 10 or at least 20 grids, even 50 grids or more, so that the grids presented to two different users may be mostly or entirely different. Preferably, the images of one group of images are not present in another group of images. Optionally, some images may be common to several groups of images. In this case, advantageously, for at least half of the set of groups of images, two distinct groups of images have less than half of the images in common.

FIG. 1 schematically represents an example of a graphical password used in an authentication method according to one embodiment of the invention.

Figure 4:
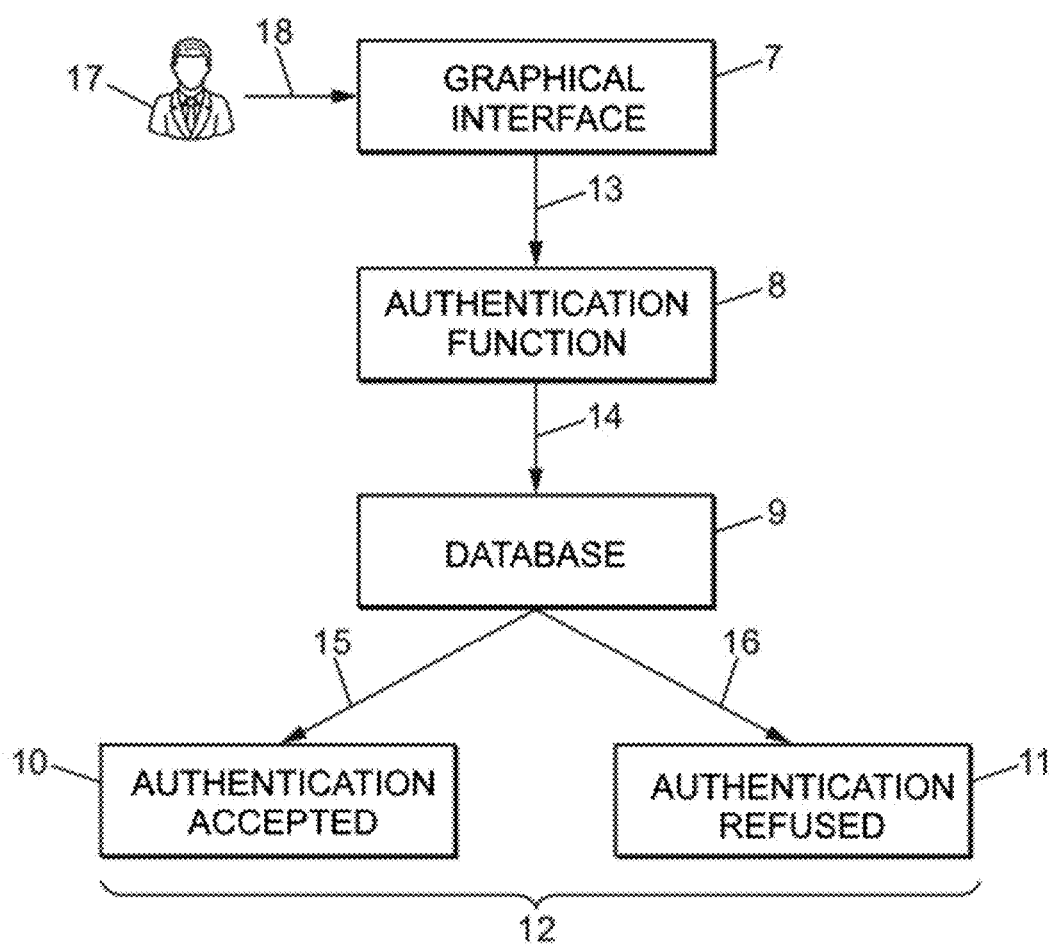
FIG. 4 schematically represents an example of the subdivision of an application into a graphical interface, an authentication function, and a database, used in an authentication method according to one embodiment of the invention.

The graphical password 6 successively comprises first an identifier of an image grid, then a series of respective identifiers of several images belonging to this image grid. In the example shown, the graphical password 6 is constructed by the identifier of the grid 2 followed by the images C, F, J, Y, K, A, E belonging to this grid 2. This password 6 is associated with the identifier of a particular user, for example user 17 as shown in FIG. 4.

Figure 2:
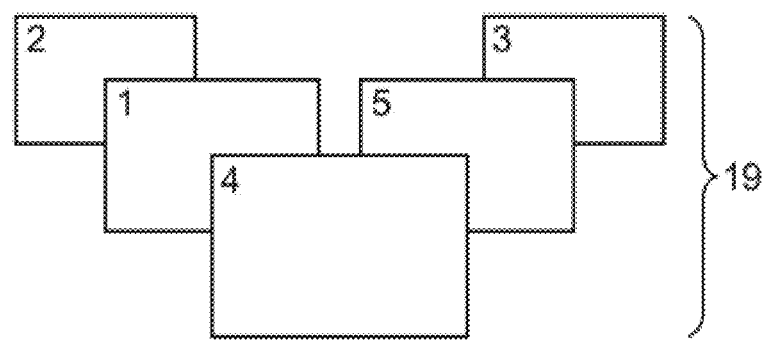
FIG. 2 schematically represents an example of set of groups of images used in an authentication method according to one embodiment of the invention.

FIG. 2 schematically represents an example of set of groups of images used in an authentication method according to one embodiment of the invention.

A carousel 19 of five grids 1 to 5 is presented to the user, who can rotate the grids and select the one in the center of the carousel 19. There, in the position of the carousel 19 represented in FIG. 2, the user could select grid 4, but will rotate the carousel 19 until grid 2, displayed at the left end, is located in the center where the user can select it since it is grid 2 which is at the head of the graphical password as shown in FIG. 1. During a next authentication, grid 2 could be displayed in the center or at the right end, or elsewhere, its position being random and usually different with each authentication. It is always these same five grids that will be proposed to the user 17, but another set of grids could be proposed to another user, with no or few grids in common.

Figure 3A:
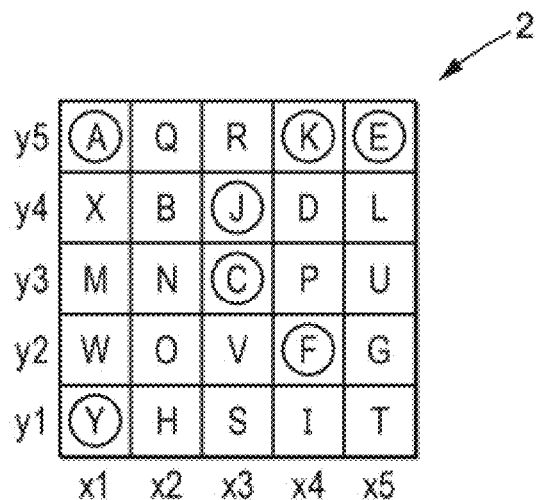
FIG. 3A schematically represents an example of a group of images used in an authentication method according to one embodiment of the invention.

FIG. 3A schematically represents an example of a group of images used in an authentication method according to one embodiment of the invention.

The images of grid 2, the 25 images represented by the letters A to Y, are pictures, preferably emoticons from the "Unicode" standard, for example those of the January 2017 version. These pictures are tied to the same theme and in a manner such that a sequence formed by the user can have a meaning and be more easily remembered by the user even when the number of images is significant, such as 5 to 7 images, for example 7 images as in the graphical password represented in FIG. 1. Grid 2 represents 25 images A to Y, distributed into a square of 5 rows by 5 columns, respectively labeled by the coordinates x1 to x5 for the columns and y1 to y5 for the rows.

When the user has to enter his or her graphical password in this grid 2, he or she will successively select the images C, F, J, Y, K, A, E, which correspond to the following series of coordinate pairs: x3/y3, x4/y2, x3/y4, x1/y1, x4/y5, x1/y5, x5/y5. The graphical interface of his or her portable device will know only the series of coordinates x3/y3, x4/y2, x3/y4, x1/y1, x4/y5, x1/y5, x5/y5, without being able to retrieve the sequence C, F, J, Y, K, A, E. Let us assume that a hacking application has stored the series of coordinates x3/y3, x4/y2, x3/y4, x1/y1, x4/y5, x1/y5, x5/y5, and see what it can do with it.

Figure 3B:
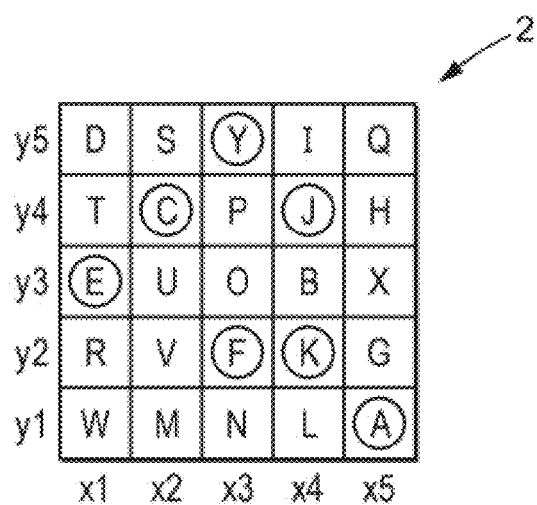
FIG. 3B schematically represents an example of the same group of images as in FIG. 3A, but having a different display order for the images, used in an authentication method according to one embodiment of the invention.

FIG. 3B schematically represents an example of the same group of images as in FIG. 3A but in a different image display order, used in an authentication method according to one embodiment of the invention.

The images of the grid 2, the 25 images represented by the letters A to Y, are also distributed into a square of 5 rows by 5 columns, respectively denoted by the coordinates x1 to x5 for the columns and y1 to y5 for the rows as in FIG. 3A, but in a completely different order than in FIG. 3A, the display of the images in the grid 2 being random and usually different with each new authentication of the user.

When the user has to enter his or her graphical password in this grid 2 again for another authentication, the user will successively select the images C, F, J, Y, K, A, E, which will correspond to the following series of coordinate pairs: x2/y4, x3/y2, x4/y4, x3/y5, x4/y2, x5/y1, x1/y3, this series being completely different from the following series of coordinate pairs: x3/y3, x4/y2, x3/y4, x1/y1, x4/y5, x1/y5, x5/y5, entered by the user during the previous authentication. Here again, the graphical interface of his or her portable device only knows the series of coordinates x2/y4, x3/y2, x4/y4, x3/y5, x4/y2, x5/y1, x1/y3, also without the ability to recover the sequence of images C, F, J, Y, K, A, E. The completely different character of the two series of coordinates, which have no relation with each other, makes them totally unusable in attempting to hack the graphical password of the user. Let us again assume that a hacking application has stored the series of coordinates x2/y4, x3/y2, x4/y4, x3/y5, x4/y2, x5/y1, x1/y3; it is clear that this hacking application cannot do anything with it. During a next authentication, the display order of the images A to Y in the grid 2 will again be different; the new series of coordinates then obtained, even if hacked, will still be of no help to the hacking application in attempting to crack the graphical password C, F, J, Y, K, A, E of the user 17, the complete password being: 2, C, F, J, Y, K, A, E (the grid identifier is at the head of the graphical password).

FIG. 4 schematically represents an example of dividing an application into a graphical interface, an authentication function, and a database, used in an authentication method according to one embodiment of the invention.

An application 12 comprises a graphical interface 7, an authentication function 8, and a database 9. An operation 18 of the user 17 to input his or her graphical password is performed on the graphical interface 7.

An operation 13 of sending the number of the group selected by the user 17 (when the user entered his or her password 18 in the graphical interface 17, done previously) and the coordinates of each image selected by the user 17 in the sequence, to the authentication function 8 is carried out by the graphical interface 7.

During a mapping operation 14, the authentication function 8 establishes the correspondence between the number and the identifier of the group selected by the user 17 and between the sequence of the coordinates and the sequence of the identifiers of the images selected by the user 17, the authentication function 8 being the only entity able to establish this correspondence.

During a comparison operation 15 and 16, the database 9 compares the identifier of the selected group and the sequence of the identifiers of the selected images respectively with the identifier of the group of the password registered for the identifier of the user 17 and with the sequence of the identifiers of the images of the password registered for the identifier of the user 17, the database 9 being the only entity able to make this comparison. At the end of this comparison operation 15 and 16, the database 9 either authenticates the user 17 if the comparison is positive, resulting in an accepted authentication 10 of the user 17, or refuses 16 to authenticate the user 17 if the comparison is negative, resulting in a denied authentication 11 of the user 17.

Ideally, for maximum security, the three parts of the application 12, namely the graphical interface 7, authentication function 8, and database 9, are under the respective control of three independent actors. Otherwise, in a less strict manner, in the case of an application 12 which is client/server, the graphical interface 7 is under the control of the client device manipulated by the user 17, while the authentication function 8 and the database 9 are under the control of either one server or two separate respective servers.

Interactions between the different parts of the application 12 and with the user 17, similar to those previously described for the method for authenticating the user 17 by means of his or her graphical password, are used for the method for creating a graphical password by the user 17.

As the different steps of the method for authenticating a user by means of his or her password and the method for creating a graphical password by a user have been described in relation to FIGS. 1 to 4 in one embodiment of the invention, another very detailed exemplary implementation of the invention will now be described, still in relation to FIGS. 1 to 4.

In the "Unicode January 2017" standard there are 2666 emoticons ("emoticon" being a registered trademark), this number increasing with each revision of the "Unicode" standard. This "image alphabet" is much larger than a conventional Latin alphabet, and much more meaningful than other alphabets such as the Greek or Cyrillic alphabet. This "image alphabet" allows a very large number of combinations: 4 emoticon characters allow creating 50,517,352, 293,136 combinations, 5 emoticon characters allow creating about $1,35^E17$ combinations, and there are even more for 6 or 7 emoticon characters.

The authentication server "Evidian Web Access Manager" can implement this principle in place of a conventional authentication method by simple password (for example alphanumeric or equivalent), with a much higher level of authentication with the graphical password authentication proposed by the invention than with a conventional authentication by simple password (for example alphanumeric or equivalent). The mobile applications "Evidian Authenticator" and "Evidian QRentry" use a conventional authentication by PIN code or fingerprint, this conventional authentication then being replaceable by the authentication method proposed by the invention which is based on a solidly secure graphical password.

The principle of having a user 17 create the graphical password 6 in an application 12 is carried out as follows. First, the user 17 is invited to create a password 6 through the graphical interface 7 of the application 12. Then, the user 17 enters his or her identifier Id in the interface 7. Next, the application 12 randomly generates a series of grids 1 to N composed of images. These images may come from, for example, either a collection specific to the application 12 containing easily identifiable images, or a well-known collection, for example images from the "emoticon" alphabet.

The grids Grl, 1 to N, have a configurable size, typically 5 rows by 5 columns therefore containing 25 images each. Each image Imj has a unique identifier IdImj known to the application 12.

The application 12 displays a selection carousel 19, on the graphical interface 7, of the different randomly generated grids Grl. The number of grids 1 to N generated (for each user) is dependent on the application, typically between 3 and 5, for example 5 here. The identifiers of the images IdImj are not transmitted in the graphical interface 7 of images proposed to the user 17. Each image Imj is identified in its grid Grl by its coordinates (xi, yk) using a reference system chosen by the application 12 according to its implementation. The application 12 knows the algorithm for translating between the positions of the images Imj displayed in the graphical interface 7 and the identifiers IdImj of each image Imj of each grid Grl.

The application 12 temporarily saves a set of grids Grl, and the following information is stored for each grid Grl:
- a global identifier GrSN for each grid Grl, this identifier being generated randomly and being unique in the set of all grids Grl generated for all users,
- a local identifier Gri, from 1 to 5, which identifies the grid Grl in the selection carousel 19 and will enable finding its identifier GrSN, a mapping table Gri< >GrSN being temporarily maintained by the application 12,
- the identifier IdImj of each image Imj of its grid Grl,
- the coordinates (xi, yk) of each image Imj,
- the reference system used, for example (x0,y0) at the bottom left, (x5, y5) at the top right, etc.

The user 17 chooses one of the grids Grl among the different grids of the selectable set of grids 1 to 5. Through the graphical interface 7, The application 12 invites the user 17 to choose a sequence of images A to Y arranged in the number 2 grid selected by the user 17. The sequence of images A to Y chosen by the user 17 is sufficiently long, at least 6 images, for example 7 images as in FIG. 1. The sequence of images A to Y is chosen by the user 17 with the goal being easy memorization. The simplest memorization technique is to create a personal story from the selected sequence of images.

The user 17 confirms his or her choice in the graphical interface 7. The graphical interface 7 sends the following information to the application 12:
- the identifier (Id) of the user 17,
- the number of the grid 2 selected by the user 17,
- the sequence of the positions (xi, yk) of the images A to Y selected by the user in the grid 2.

The application 12 receives the information from the graphical interface 7. The application 12 uses a plurality of permanent storage areas for this information.

Let Collmg be the collection of all images Imj of the system and their identifiers IdImj.

Let ColGr be a database of all grids Grl generated and used by the users. Each grid Grl is identified by an identifier GrSN and contains the list of identifiers IdImj of the images composing this grid. The identifier GrSN is random and unique.

Here the database 9 is in fact divided more particularly into two separate databases, a first database B0 and a second database B1. Database B0 contains, for each user 17 identified by his or her identifier Id, the list of identifiers of the grids GrSN generated and displayed in the carousel 19 for creating the graphical password 6 or during authentication.

Database B1, typically a directory, contains for each user 17 identified by his or her identifier Id, a hash of a string composed of the elements $(GrSn)(IdImj)_{(0)}(IdImj)_{(1)} \ldots (IdImj)_{(n)}$. The hash function used is non-reversible and has no or few collisions, for example "MD5", or "SHA1", or "SHA2", or "bcrypt", etc. The hash function uses a "salting" function (integrating data specific to the user 17) to avoid brute force attacks.

The application 12, after receiving the information from the graphical interface 7, performs the following operations:
- a reverse translation operation (Gri)>(GrSN) is applied to the number of the grid Gri (local number of a given grid in the carousel 19 concerned for the user 17) selected by the user 17,
- a reverse transformation operation relative to the chosen reference system is applied to the sequence of positions (xi,yk), and a translation (xi,yk) to IdImj is performed in order to obtain the sequence of identifiers IdImj of the images selected by the user 17, this translation being applied to the grid identifier GrSN obtained in the previous step.

Then, the application 12 saves, in the database ColGr, the list of grids Grl that have been displayed in the selection carousel 19. Each grid is stored with its identifier GrSN and the list of images identified by their identifiers IdImj.

Next, the application saves the following information in database B0:
- the identifier Id of the user 17,
- the list of grids 1 to 5 presented in the carousel 19 and associated with the user 17. The grids Grl are identified by identifiers GrSN, only these identifiers being stored in the file associated with the user 17 (with the corresponding local numbers Gri of these grids), the content of the grids Grl not being stored in database B0.

After this, the application 12 stores, in database B1, the "password" information 6 associated with the user 17. This information is constructed according to the following formula: RGrSn)(IdImj)$_{(0)}$(IdImj)$_{(1)}$ where GrSn is the identifier of the grid 2 chosen by the user 17 and (IdImj)$_{(n)}$ is the sequence of images selected by the user 17 in this selected grid 2. This information is converted into character strings to be more easily manipulated, for example separating each item with a ";" and applying a "Base64" conversion (resulting in a final string that is alphanumeric only) to the resulting string. The principle of saving the password in database B1 will depend on the nature of database B1. For a directory, the graphical password 6 is stored as a conventional password string, and the hash mechanism implemented by the directory will be used. For a database B1 that does not have a hash mechanism, the password string will be hashed before storing, using simple and robust hash mechanisms.

The graphical password 6 of the user 17 is thus created after all these operations. To summarize, the following information is stored:

in the collection of grids ColGr, the grids and their content formed by the image identifiers IdImj of all the grids of all the users, in database B0, the list of grids 1 to 5 associated with each of the users 17, in database B1, the hash of the graphical password 6 in the user's identity record when database B1 is a directory. The graphical password 6 is not stored in reversible form anywhere in the application 12.

The principle of authenticating the user 17 is to verify that the user 17 is able to select a sequence of images Imj as they were registered during the step of creating the graphical password 6.

The user 17 enters his or her identifier Id in the graphical interface 7. The graphical interface 7 sends the identifier Id to the application 12. The application 12 determines whether the identifier Id of the user 17 is present in its database B0.

If it is not present, the application 12 can choose to:

generate an error message inviting the user 17 to enter another identifier, or send the user 17 to the graphical interface 7 for creating the password 6, or display the authentication steps using random data, thus not revealing the existence or non-existence of the user corresponding to the erroneous identifier, If the identifier Id is present in database B0, the application 12:

based on the identifier Id of the user 17, obtains from database B0 the list of grids Grl identified by their identifier GrSN, obtains from database B0 the list of identifiers IdImj of the images Imj which compose the grids identified by their identifier GrSN.

For each grid identifier GrSN, the application 12 obtains from the collection ColImg the images identified by their identifier IdImj. For each grid identifier GrSN, the application 12 randomly places the image identifiers IdImj in a grid Grl of 5 rows by 5 columns (for example in a 25-image implementation) and stores the coordinates (xi,yk) using a reference system known to the application 12. The table mapping the coordinates (xi, yk) to the image identifiers IdImj is maintained temporarily throughout the entire authentication process.

The application 12 randomly creates a table for converting global identifiers GrSN into local identifiers Gri, which will be sent to the graphical interface 7. For each grid identifier Gri, the application 12 sends to the graphical interface 7 the list of coordinates (xi,yk) and the list of images to display. The application 12 could also send all the images of a grid in the form of a single image containing all images of the grid prearranged into a single image.

The graphical interface 7 receives from the application 12 a list of grids and images containing:

the identifier Gri of the grid Grl in the carousel 19, the images that make up the grid, or a single image containing all these images, possibly the coordinates (xi,yk) of the images of the grid; these coordinates (xi, yk) may be implicitly known and shared between the graphical interface 7 and the application 12, and then are simply dependent on the order of the images in the image list.

The graphical interface 7 then places has the grids with identifiers Gri 1 to 5 in a selection carousel 19.

The graphical interface 7 arranges the images according to the coordinates (xi,yk) or grouped into a single image, depending on how the images are sent by the application 12. The user 17 selects the grid 2 which contains the images of his or her graphical password 6. One by one, the user 17 selects the images that compose his or her graphical password 6.

The graphical interface 7 has several buttons and fields, for example:

a field displaying, for example, a "*" character for each selected image, which gives the user 17 a visual indication of each selected image, a button for deselecting the last image, a button for deselecting all selected images, a button to accept the list of selected images.

The user 17 confirms his or her graphical password 6, and the graphical interface 7 then sends the following information to the application 12:

the number of the grid, in other words the local identifier of the grid Gri, here 2, selected by the user 17, the sequence of the positions (xi, yk) of the images selected by the user 17 in the selected grid 2.

The application 12 receives the information from the graphical interface 7. The application 12 then performs the following operations:

a reverse translation operation Gri>GrSN is applied to the number of the grid Gri, here 2, selected by the user 17, a reverse transformation operation relative to the chosen reference system is applied to the sequence of positions (xi,yk), and a translation of the positions (xi,yk) to the image identifiers IdImj is performed in order to obtain the sequence of the identifiers idlmj of the images selected by the user 17, this translation being applied to the grid GrSN obtained in the previous step.

The graphical password 6 is constructed according to the following formula [(GrSn)(IdImj)$_{(0)}$(IdImj)$_{(1)}$ . . . (IdImj)$_{(n)}$], where GrSn is the identifier of the grid chosen by the user 17 and (IdImj)$_{(n)}$ is the sequence of images selected by the user 17. In accordance with the phase of creating the graphical password 6, the information of the graphical password 6 is converted into character strings to be more easily manipulated, for example by separating each item with a ";" and applying a "Base64" conversion to the resulting string.

If database B1 is a directory, the graphical password 6 will be sent as is to a directory which will compare the hash of this graphical password 6 with the hash of the graphical password 6 associated with the identifier Id of the user 17. The internal hash function of the directory is used.

Alternatively, if database B1 is a conventional database, the hash of the graphical password 6 will be calculated by the application 12 and compared to the hash of the graphical password 6 associated with the identifier Id of the user 17.

If the comparison of the hash of the graphical password 6 entered by the user 17 is identical to the one saved in database B1 for this same identifier Id of the user 17, then the user 17 is authenticated. Otherwise the authentication is rejected.

Of course, the invention is not limited to the examples and the embodiment described and shown, but is capable of numerous variants accessible to those skilled in the art.

The invention claimed is:

1. Method for authenticating a user (17) by user identifier and associated graphical password (6), where the graphical password (6) comprises a first part obtained by a first selection of a group of images (1-5) from several groups of images (1-5), and a second part obtained by a second selection of a sequence of several images (A-Y) in the selected group of images (1-5), the method comprising:
   requesting the user (17) give a user identifier to an application (12), and graphically select:
      a first selection of a group of images (1-5) in a set of several groups of images (1-5), the order of the groups of images (1-5) in this set of groups of images (1-5) being randomly displayed by the application (12) with each new authentication of said user (17),
      a second selection of a sequence of several images (A-Y) in this group of images (1-5), the order of the images (A-Y) in this group of images (1-5) being randomly displayed by the application (12) with each new authentication of said user (17),
   identifying the position of the selected group of images (1-5) in said set of groups of images (1-5) and identifying the position of each selected image (A-Y) in said sequence,
   establishing (14) the correspondence between the position of the selected group of images (1-5) and the identifier of the selected group of images (1-5), and between the sequence of the positions of the selected images (A-Y) and the sequence of the identifiers of the selected images (A-Y),
   comparing (15-16) the identifier of the group of selected images (1-5) with the identifier of the group of images (1-5) of the password (6) registered for said user (17) identifier, and comparing the sequence of the identifiers of the selected images (A-Y) with the sequence of the identifiers of the images (A-Y) of the password (6) registered for said user (17) identifier, the application (12) being the only entity able to establish this correspondence and/or the application (12) being the only entity able to make this comparison; and
   authenticating (15) said user (17) if said comparison is positive but refusing (16) to authenticate said user (17) if said comparison is negative;
   wherein said order of the groups of images (1-5) in this set of groups of images (1-5) is randomly displayed by the application (12) with each new authentication of said user (17), in the form a carousel (19) of image grids (1-5).

2. Authentication method according to claim 1, wherein said order of the images (A-Y) in this group of images (1-5) is randomly displayed by the application (12) with each new authentication of said user (17), in the form of a grid of images (1-5) distributed into rows and columns.

3. Authentication method according to claim 1, wherein the number of groups of images (1-5) in the set of groups of images (1-5) is at least two or even at least five times smaller than the number of images (A-Y) in a group of images (1-5), regardless of whether all the groups (1-5) have the same number of images (A-Y).

4. Authentication method according to claim 1, wherein the images (A-Y) are divided into the groups of images (1-5) by theme.

5. Authentication method according to claim 1, further comprising:
   sending the number of the selected group (1-5) and/or the coordinates of each selected image (A-Y) in said sequence to an authentication function (8) which establishes the correspondence between said number and the identifier of the selected group (1-5) and/or between the sequence of said coordinates and the sequence of the identifiers of the selected images (A-Y), the authentication function (8) being the only entity able to establish this correspondence
   comparing (15-16), in a database (9), the identifier of the selected group (1-5) and the sequence of the identifiers of the selected images (A-Y) respectively with the identifier of the group (1-5) of the password (6) registered for said user (17) identifier and with the sequence of the identifiers of the images (A-Y) of the password (6) registered for said user (17) identifier, the database (9) being the only entity able to make this comparison; and
   authenticating (15) said user (17) if said comparison is positive but refusing (16) to authenticate said user (17) if said comparison is negative.

6. Authentication method according to claim 5, wherein:
   said graphical interface (7), said authentication function (8), and said database (9) are under the control of at least two independent actors, and
   when said application (12) runs in client-server mode, said graphical interface (7) is located on the client while said authentication function (8) and said database (9) are located on the server.

7. Authentication method according to claim 6, wherein said graphical interface (7), said authentication function (8), and said database (9) are under the control of three independent actors.

8. Authentication method according to claim 1, wherein:
   said set of groups of images (1-5) comprises a number of groups of images (1-5) which is between 3 and 10,
   and/or said groups of images (1-5) each comprise a number of images (A-Y) which is comprised between 10 and 50.

9. Authentication method according to claim 1, wherein several separate applications (12) use the same images (A-Y) but with a different distribution between groups of images (1-5) from one application (12) to another.

10. Authentication method according to claim 1, wherein the graphical password (6) is stored by the application (12) in a non-reversible form.

11. Authentication method according to claim 1, wherein:
   either no image (A-Y) is common to two groups of images (1-5) that are distinct from each other,
   or, if one or more images (A-Y) are common to at least two groups of images (1-5) that are distinct from each other, then for at least half of the groups of images (1-5), any two groups of images (1-5) in this half of the groups of images (1-5) always have less than half of their images (A-Y) in common.

12. Method for authenticating a user (17) by user identifier and associated graphical password (6), where the graphical password (6) comprises a first part obtained by a first selection of a group of images (1-5) from several groups of images (1-5), and a second part obtained by a second selection of a sequence of several images (A-Y) in the selected group of images (1-5), the method comprising:
- requesting the user (17) give a user identifier to an application (12), and graphically select:
  - a first selection of a group of images (1-5) in a set of several groups of images (1-5), the order of the groups of images (1-5) in this set of groups of images (1-5) being randomly displayed by the application (12) with each new authentication of said user (17),
  - a second selection of a sequence of several images (A-Y) in this group of images (1-5), the order of the images (A-Y) in this group of images (1-5) being randomly displayed by the application (12) with each new authentication of said user (17),
- identifying the position of the selected group of images (1-5) in said set of groups of images (1-5) and identifying the position of each selected image (A-Y) in said sequence,
- establishing (14) the correspondence between the position of the selected group of images (1-5) and the identifier of the selected group of images (1-5), and between the sequence of the positions of the selected images (A-Y) and the sequence of the identifiers of the selected images (A-Y),
- comparing (15-16) the identifier of the group of selected images (1-5) with the identifier of the group of images (1-5) of the password (6) registered for said user (17) identifier, and comparing the sequence of the identifiers of the selected images (A-Y) with the sequence of the identifiers of the images (A-Y) of the password (6) registered for said user (17) identifier, the application (12) being the only entity able to establish this correspondence and/or the application (12) being the only entity able to make this comparison; and
- authenticating (15) said user (17) if said comparison is positive but refusing (16) to authenticate said user (17) if said comparison is negative, further comprising:
  - sending the number of the selected group (1-5) and/or the coordinates of each selected image (A-Y) in said sequence to an authentication function (8) which establishes the correspondence between said number and the identifier of the selected group (1-5) and/or between the sequence of said coordinates and the sequence of the identifiers of the selected images (A-Y), the authentication function (8) being the only entity able to establish this correspondence,
  - comparing (15-16), in a database, the identifier of the selected group (1-5) and the sequence of the identifiers of the selected images (A-Y) respectively with the identifier of the group (1-5) of the password (6) registered for said user (17) identifier and with the sequence of the identifiers of the images (A-Y) of the password (6) registered for said user (17) identifier, a database (9) being the only entity able to make this comparison; and
  - authenticating (15) said user (17) if said comparison is positive but refusing (16) to authenticate said user (17) if said comparison is negative,
  - wherein said graphical interface (7), said authentication function (8), and said database (9) are under the control of at least two independent actors.

13. Method according to claim 12, wherein said graphical interface (7), said authentication function (8), and said database (9) are under the control of three independent actors.

\* \* \* \* \*